US010677685B2

(12) United States Patent
Thomson

(10) Patent No.: US 10,677,685 B2
(45) Date of Patent: Jun. 9, 2020

(54) METHOD, COMPUTER PROGRAM PRODUCT AND SYSTEM

(71) Applicant: AKTIEBOLAGET SKF, Göteborg (SE)

(72) Inventor: Allan Thomson, Lanark (GB)

(73) Assignee: AKTIEBOLAGET SKF, Gothenburg (SE)

(*) Notice: Subject to any disclaimer, the term of this patent is extended or adjusted under 35 U.S.C. 154(b) by 363 days.

(21) Appl. No.: 14/781,929

(22) PCT Filed: Apr. 5, 2013

(86) PCT No.: PCT/EP2013/057173
§ 371 (c)(1),
(2) Date: Oct. 2, 2015

(87) PCT Pub. No.: WO2014/161587
PCT Pub. Date: Oct. 9, 2014

(65) Prior Publication Data
US 2016/0069775 A1 Mar. 10, 2016

(51) Int. Cl.
G01M 13/04 (2019.01)
G01N 29/14 (2006.01)
(Continued)

(52) U.S. Cl.
CPC .......... *G01M 13/04* (2013.01); *G01M 13/045* (2013.01); *G01N 29/14* (2013.01);
(Continued)

(58) Field of Classification Search
CPC .... G01M 13/04; G01M 13/045; G01N 29/14; G01N 29/46; G01N 2291/2696; G05B 23/2083
See application file for complete search history.

(56) References Cited

U.S. PATENT DOCUMENTS 6,711,952 B2 * 3/2004 Leamy ............... F01D 21/00
73/579
6,768,706 B1 7/2004 Tonami
(Continued)

FOREIGN PATENT DOCUMENTS

CN 202645849 U 1/2013
EP 1791047 A2 5/2007
(Continued)

OTHER PUBLICATIONS

Lin T R et al: "A practical signal processing approach for condition monitoring of low speed machinery using Peak-Hold-Down-Sample algorithm" Mechanical Systems and Signal Processing, Dec. 8, 2012, vol. 36, No. 2.
(Continued)

*Primary Examiner* — Manuel L Barbee
(74) *Attorney, Agent, or Firm* — Garcia-Zamor Intellectual Property Law, LLC; Ruy Garcia-Zamor; Bryan Peckjian

(57) ABSTRACT

A method for processing data obtained from a condition monitoring system, which comprises the step of obtaining dynamic signal data in the form of a time waveform and/or a Fast Fourier Transform (FFT) from at least one sensor. The method comprises the step of extracting at least two parameters from the time waveform and/or FFT and transmitting or displaying the at least two parameters instead of the dynamic signal time waveform data and/or a Fast Fourier Transform (FFT).

15 Claims, 3 Drawing Sheets

(51) Int. Cl.
    *G05B 23/02*     (2006.01)
    *G01M 13/045*     (2019.01)
    *G01N 29/46*     (2006.01)

(52) U.S. Cl.
    CPC ......... *G01N 29/46* (2013.01); *G05B 23/0283* (2013.01); *G01N 2291/2696* (2013.01)

(56) References Cited

U.S. PATENT DOCUMENTS

| | | |
|---|---|---|
| 7,270,016 B2 | 9/2007 | Sentoku et al. |
| 7,705,743 B2 | 4/2010 | Barone et al. |
| 2003/0030565 A1 | 2/2003 | Sakatani et al. |
| 2004/0019461 A1* | 1/2004 | Bouse ............... G05B 23/0229 702/188 |
| 2004/0128083 A1* | 7/2004 | Wang ................. B41F 13/0045 702/35 |
| 2005/0072236 A1 | 4/2005 | Heyman et al. |
| 2005/0246150 A1 | 11/2005 | Shiromaru et al. |
| 2006/0132190 A1 | 6/2006 | Driediger et al. |
| 2008/0033695 A1 | 2/2008 | Sahara et al. |
| 2008/0234964 A1 | 9/2008 | Miyasaka et al. |
| 2010/0073163 A1 | 3/2010 | Mahmoud et al. |
| 2012/0239716 A1 | 9/2012 | Murray |
| 2013/0006540 A1 | 1/2013 | Sakaguchi et al. |
| 2013/0211742 A1 | 8/2013 | Mol |
| 2015/0369698 A1 | 12/2015 | Sakaguchi et al. |
| 2016/0047717 A1 | 2/2016 | McGoogan |
| 2016/0069775 A1 | 3/2016 | Thomson |

FOREIGN PATENT DOCUMENTS

| | | | |
|---|---|---|---|
| JP | 6016001 B2 | 4/1985 | |
| JP | 2601799 B2 | 4/1997 | |
| JP | 2004301017 A | 4/2006 | |
| JP | 2009244090 A | 10/2009 | |
| WO | WO 2011023209 A1 * | 3/2011 | ............ G01M 13/04 |
| WO | WO-2011023209 A1 * | 3/2011 | ............ G01M 13/04 |
| WO | 2012159208 A1 | 11/2012 | |

OTHER PUBLICATIONS

Bachmaier S A: "Event-based acoustic emission technique for structural health monitoring using wireless sensor networks," NDT. net—The e-Journal of Nondestructive Testing, Dec. 2008.

Timmerman H: "Monitorizacion mas eficaz en turbinas eolicas a traves de tecnicas de medicion por emision acustica," Slides of a presentation given at the Jornadas Tecnicas 2012, Asociacion Empresarial Eolica, 26-27.

"Jornadas Tecnicas 2012", Website of the Asociacion Empresarial Eolica, Sep. 2012.

SKF: "Extend warning time and reduce the risk of ebaring failure using SKF Acoustic Emission Enveloping", SKF Application Note CM/P9 13397 EN, Nov. 2012, p. 13397.

SKF: "CMSS 786M SEE/AEE sensor mounting for on-line system", SKF Application Note CM3153 EN, Aug. 2012.

SKF: "Analyzer configurations for SKF Acoustic Emission Enveloping (AEE) measurements", SKF Application Note CM3154/1 EN, Jun. 2013, 6-14.

SKF: "Analysis and interpretation of SKF Acoustic Emission Enveloping (AEE) measurements", SKF Application Note CM3155/1 EN, Aug. 2013, 3-4.

Yuan H et al: "A selection method of acoustic emission characteristic parameters based on mutual information and distance measurement", 2012 9th International Conference on Fuzzy Systems and Knowledge Discovery (FSKD 2012), May 29-31, 2012, May 29, 2012 (May 29, 2012), pp. 1377-1381.

Penti Kai Nen V et al: 11 Industrial and non-consumer applications of wireless sensor networks, Proceedings of SPIE, vol. 6983, Paper 69830K, 2008.

Li R et al: "Investigation on fault detection for split torque gearbox using acoustic emission and vibration signals", Annual Conference of the Prognostics and Health Management Society, 2009, 2009, XP055109414, section 2; figures 3, 5.

Hay T R et al : 1 Trans formi ng bridge monitoring from time-based to predictive maintenance using acoustic emission MEMS sensors and artificial intelligence, 7th World Congress on Railway Research 2006, Jun. 4-8, 2006, Montreal, Canada, 2006.

Chan JC et al: 11 A novel, fast, reliable data transmission algorithm for wireless machine health monitoring, IEEE Transactions on Reliability, vol. 58, No. 2, Jun. 2009 (Jun. 2009), pp. 295-304.

Jagannath V MD et al: 11 WiBeaM:Wireless Bearing Monitoring System, 2nd IEEE International Conference on Communication Systems Software and Middleware (Comsware 2007), Jan. 7-12, 2007, Bangalore, India, Jan. 7, 2007 (Jan. 7, 2007).

SKF: "CMSS 786M SEE/AEE sensor mounting for on-line systems", SKF Application Note CM3153 EN, Aug. 2012 (Aug. 2012), XP055110815.

IEEE-SA Standards Board, Standard Test Language for All Systems—Common/Abbreviated Test Language for All Systems (C/ATLAS), IEEE Std 716 TM—1995 (R2011), Reaffirmed Dec. 7, 2011 (Year: 2011).

* cited by examiner

METHOD, COMPUTER PROGRAM PRODUCT AND SYSTEM

CROSS REFERENCE TO RELATED APPLICATION

This is a United States National Stage application claiming the benefit of International Application Number PCT/EP2013/057173 filed on 05 Apr. 2013, which is incorporated herein by reference in its entirety.

TECHNICAL FIELD

The present invention concerns a method, system and computer program product for processing data obtained from a condition monitoring system, such a condition monitoring system for monitoring and optionally predicting the residual life of a component, such as a bearing, i.e. for predicting when it is necessary or desirable to service, replace or refurbish (re-manufacture) the component.

BACKGROUND OF THE INVENTION

Condition monitoring is the process of determining the condition of machinery while in operation. Condition monitoring enables the repair of problem components prior to failure and not only helps plant personnel reduce the possibility of catastrophic failure, but also allows them to order parts in advance, schedule manpower, and plan other repairs during downtime.

Components such as rolling-element bearings are often used in critical applications, wherein their failure in service would result in significant commercial loss to the end-user. It is therefore important to be able to predict the residual life of such a bearing, in order to plan intervention in a way that avoids failure in service, while minimizing the losses that may arise from taking the machinery in question out of service to replace the bearing.

The residual life of a rolling-element bearing is generally determined by fatigue of the operating surfaces as a result of repeated stresses in operational use. Fatigue failure of a rolling element bearing results from progressive flaking or pitting of the surfaces of the rolling elements and of the surfaces of the corresponding bearing races. The flaking and pitting may cause seizure of one or more of the rolling elements, which in turn may generate excessive heat, pressure and friction.

Bearings are selected for a specific application on the basis of a calculated or predicted residual life expectancy compatible with the expected type of service in the application in which they will be used. However, this type of life prediction is considered inadequate for the purpose of maintenance planning for several reasons.

One reason is that the actual operation conditions may be quite different from the nominal conditions. Another reason is that a bearing's residual life may be radically compromised by short-duration events or unplanned events, such as overloads, lubrication failures, installation errors, etc. Yet another reason is that, even if nominal operating conditions are accurately reproduced in service, the inherently random character of the fatigue process may give rise to large statistical variations in the actual residual life of substantially identical bearings.

In order to improve maintenance planning, it is common practice to monitor the values of physical quantities related to vibrations and temperature to which a component, such as a bearing, is subjected in operational use, so as to be able to detect the first signs of impending failure.

In a condition monitoring system data dynamic signal data is obtained in the form of a time waveform (i.e. a graph of a varying quantity against time which usually consists of many samples) and/or a Fast Fourier Transform (FFT) from at least one sensor. These time waveforms and/or FFTs are usually transmitted and displayed to an analyst. This can however result in long transmission and display times and the data can be difficult to display or interpret. The transmission, display and interpretation of such data can require a significant amount of energy, time and expertise, and consequently decreases the rate at which measurements and analyses can be made.

There are condition monitoring systems using vibration level sensors in which only the "overall amplitudes" (i.e. the total amount of vibration occurring in a selected frequency range) of a particular signal are transmitted or displayed. However, such transmitted or displayed data has limited value since it provides no information about the nature of a signal. Additionally, no further information can be post-processed from the transmitted or displayed overall amplitude values.

SUMMARY OF THE INVENTION

An object of the invention is to provide an improved method for processing data obtained from a condition monitoring system.

This object is achieved by a method comprising the steps of obtaining dynamic signal data in the form of a time waveform and/or a Fast Fourier Transform (FFT) from at least one sensor, extracting at least two parameters from the time waveform and/or FFT and transmitting or displaying the at least two parameters instead of the dynamic signal time waveform data and/or a Fast Fourier Transform (FFT).

The at least two parameters may be selected depending on the type of dynamic signal and/or FFT being provided by the at least one sensor and/or the specific application so as to provide the information necessary for the assessment of at least one component being monitored by the at least one sensor of the condition monitoring system.

Such a method avoids the need to transmit and/or display the whole time waveform data from dynamic signals and reduces the amount of data that needs to be transmitted by extracting at least two parameters from the dynamic signal's time waveform and/or FFT and transmitting only that part of the data provided by the at least one sensor. This leads to a significant reduction of the data that needs to be transmitted and/or displayed. Transmission, display and data processing times will therefore be shorter, less energy will be required for transmission, display and processing, which consequently results in extending the sensor battery life, or reducing the sensor battery size or power generation requirement.

A user will be more quickly warned of deterioration in the condition of a component being monitored and poor installation or poor operating practices, such as misalignment, imbalance, high vibration, lack of lubrication and contamination in the lubricant, etc., which would reduce the residual life of the component if left uncorrected, will be more quickly identified.

According to an embodiment of the invention the step of extracting at least two parameters is carried out using Discrete Wavelet Transform (DWT), Continuous Wavelet Transform (CWT) or another time domain analysis.

According to another embodiment of the invention the at least two parameters are at least two of the following: quantitative or statistical parameters, peak-to-peak amplitude, Root Mean Squared (RMS) amplitude, a statistical value such as a maximum, minimum, mean or median value, Crestfactor, Kurtosis, threshold crossing event counts, periodicity of events, wavelet- or FFT-derived amplitudes (specific, narrow and broad band) or parameters, such as harmonic activity or sideband activity.

According to a further embodiment of the invention the at least one sensor is arranged to obtain data concerning at least one of the following: vibration, vibration enveloping, acoustic emission (AE), acoustic emission enveloping (AEE), temperature, rolling contact force/stress, high frequency stress waves, lubricant condition, rolling surface damage, operating speed, load carried, lubrication conditions, humidity, exposure to moisture or ionic fluids, exposure to mechanical shocks, corrosion, fatigue damage, wear.

According to an embodiment of the invention the at least two parameters are transmitted wirelessly over a wireless communication network.

According to another embodiment of the invention the method comprises the step of recording the at least two parameters electronically in a database.

According to a further embodiment of the invention the condition monitoring system is arranged to monitor at least one bearing, such as a rolling element bearing. The rolling bearing may be any one of a cylindrical roller bearing, a spherical roller bearing, a toroidal roller bearing, a taper roller bearing, a conical roller bearing or a needle roller bearing.

The present invention also concerns a computer program product that comprises a computer program containing computer program code means arranged to cause a computer or a processor to execute the steps of a method according to any of the embodiments of the invention, stored on a computer-readable medium or a carrier wave.

The present invention further concerns a system for processing data obtained from a condition monitoring system comprising at least one sensor arranged to provide dynamic signal data in the form of a time waveform or a Fast Fourier Transform (FFT). The system comprises a processing unit arranged to extract at least two parameters from the dynamic signal's time waveform and/or FFT and transmission means arranged to transmit, and/or display means arranged to display, the at least two parameters instead of the dynamic signal time waveform data and/or a Fast Fourier Transform (FFT).

According to an embodiment of the invention the processing unit is arranged to extract the at least two parameters using Discrete Wavelet Transform (DWT), Continuous Wavelet Transform (CWT) or another time domain analysis.

According to another embodiment of the invention the at least two parameters are at least two of the following: quantitative or statistical parameters, a peak-to-peak amplitude, an RMS amplitude, a statistical value such as a maximum, minimum, mean or median value, Crestfactor, Kurtosis, threshold crossing event counts, periodicity of events values, wavelet- or FFT-derived amplitudes or parameters, such as harmonic activity or sideband activity.

According to a further embodiment of the invention the at least one sensor is arranged to obtain data concerning at least one of the following: vibration, vibration enveloping, acoustic emission (AE), acoustic emission enveloping (AEE), temperature, rolling contact force/stress, high frequency stress waves, lubricant condition, rolling surface damage, operating speed, load carried, lubrication conditions, humidity, exposure to moisture or ionic fluids, exposure to mechanical shocks, corrosion, fatigue damage, wear.

According to an embodiment of the invention the transmitting means is arranged to transmit the at least two parameters wirelessly over a wireless communication network.

According to another embodiment of the invention it comprises a recording means arranged to electronically record the at least two parameters in a database. The system may comprise a prediction unit configured to predict the residual life of a component such as a bearing, using the recorded data or the at least two parameters.

According to a further embodiment of the invention the condition monitoring system is arranged to monitor at least one bearing, such as a rolling element bearing.

It should be noted that the method, computer program and system according to the present invention may be used to monitor at least one component, such as a bearing during the component's manufacture, after the component's manufacture and before the component's use, during the component's use, during a period when the component is not in use and/or during the transportation of the component. A complete history log of a component may thereby be created. Accordingly, as a result of having residual life data accumulated over the component's life, starting with its very manufacturing all the way up to the present, a more accurate prediction can be made regarding the residual life of an individual component at any point in its life-cycle. An analyst or end user may be notified of relevant facts including the time at which it is advisable to replace or refurbish the component.

The method, system and computer program product according to the present invention may be used to monitor and optionally predict the residual life of at least one component, such as a bearing, used in automotive, aerospace, railroad, mining, wind, marine, metal producing and other machine applications which require high wear resistance and/or increased fatigue and tensile strength.

BRIEF DESCRIPTION OF THE DRAWINGS

The present invention will hereinafter be further explained by means of non-limiting examples with reference to the appended figures where.

It should be noted that the drawings have not been drawn to scale and that the dimensions of certain features have been exaggerated for the sake of clarity.

Furthermore, any feature of one embodiment of the invention can be combined with any other feature of any other embodiment of the invention as long as there is no conflict.

DETAILED DESCRIPTION OF EMBODIMENTS

Figure 1:
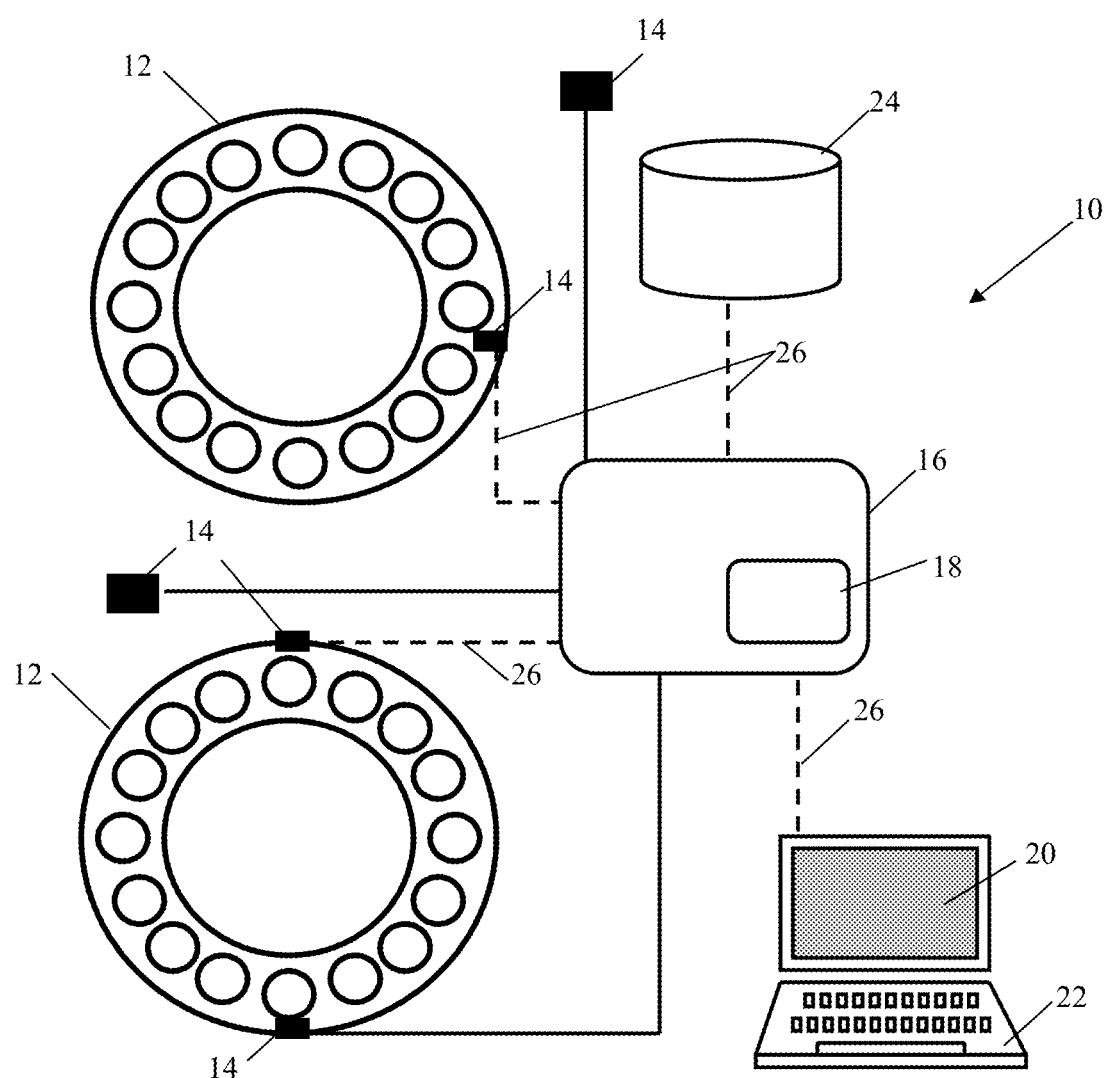
FIG. 1 shows a system according to an embodiment of the invention.

FIG. 1 shows a system 10 for monitoring the condition, and optionally predicting the residual life of a plurality of bearings 12 during their use. The illustrated embodiment shows two rolling element bearings 12, the system 10 according to the present invention may however be used to monitor and optionally predict the residual life of one or more components of any type, and not necessarily all of the same type or size. The system 10 comprises a plurality of sensors 14 configured to obtain data concerning one or more of the factors that influence the residual life of each bearing 12. A sensor 14 may be integrated with a bearing 12, it may be placed in the vicinity of the bearing 12 or remotely from the bearing.

The inner ring and/or outer ring of a bearing 12, which can be monitored using a system or method according to an embodiment of the invention, may be of any size and have any load-carrying capacity. An inner ring and/or an outer ring may for example have a diameter up to a few meters and a load-carrying capacity up to many thousands of tons.

The sensors 14 are configured to obtain data concerning one or more of the factors that influence the residual life of a bearing 12. For example, the sensors 14 may be configured to obtain data concerning at least one of the following: vibration, temperature, rolling contact force/stress, high frequency stress waves, lubricant condition, rolling surface damage, operating speed, load carried, lubrication conditions, humidity, exposure to moisture or ionic fluids, exposure to mechanical shocks, corrosion, fatigue damage, wear. Data may be obtained periodically, substantially continuously, randomly, on request, or at any suitable time.

Rolling contact forces may for example be recorded by a strain sensor 14 located on an outer surface or side of the bearing's outer ring, or on an inner surface or inner side of the bearing's inner ring. Such a strain sensor 14 could be of the resistance type or use the stretching of an optical fiber embedded within the bearing 12.

A sensor 14 may be embedded in the bearing ring or attached externally to the bearing housing to monitor a lubricant condition. Lubricant can be degraded by contamination in several ways. For example, a lubricant film may fail to protect a bearing 12 against corrosion, either because of its water content or the entrainment of corrosive materials, e.g., acid, salt, etc. As another example, a lubricant film may be contaminated with solid material that has an abrasive effect on the bearing's raceway. A lubrication film can also be compromised by excessive load, low viscosity of the lubricant or contamination of the lubricant with particulate material, or a lack of lubricant. The condition of the lubrication film can be assessed by detecting high-frequency stress waves that propagate through the bearing rings and the surrounding structure in the event of a breakdown of the lubrication film.

The system 10 in the illustrated embodiment comprises a processing unit 16 arranged to extract at least two parameters from the dynamic signals time waveforms and/or FFTs provided by the sensors 14, and transmission means 18 arranged to transmit the at least two parameters to a display means 20 and/or a device 22 used by a user or analyst and/or a database 24 where the at least two parameters may be electronically recorded. Data may be transmitted to and from the sensors 14, and to and from the processing means 16 in a wired or wireless (26) manner over a wireless communication network.

The database 24 may be maintained by the manufacturer of the bearings 12. The residual life data gathered in the database 24 for a whole batch of bearings 12 enables the manufacturer to extract further information, e.g., about relationships between types or environments of usage versus rates of change of residual life, so as to further improve the service to the end-user.

The system 10 may also comprise a prediction unit (not shown) configured to predict the residual life of each bearing 12 using the recorded data in the database 24 and a mathematical residual life predication model.

It should be noted that not all of the components of the system 10 necessarily need to be located in the vicinity of the bearings 12. For example, the database 24 and/or user device 22 may located at a remote location and communicate with at least one data processing unit 16 located in the same or a different place to the bearings 12 by means of a server for example.

It should also be noted that the at least one data processing unit 16, the transmission means 18 and/or the database 24 need not necessarily be separate units but may be combined in any suitable manner. For example a personal computer may be used to carry out a method concerning the present invention.

Figure 2:
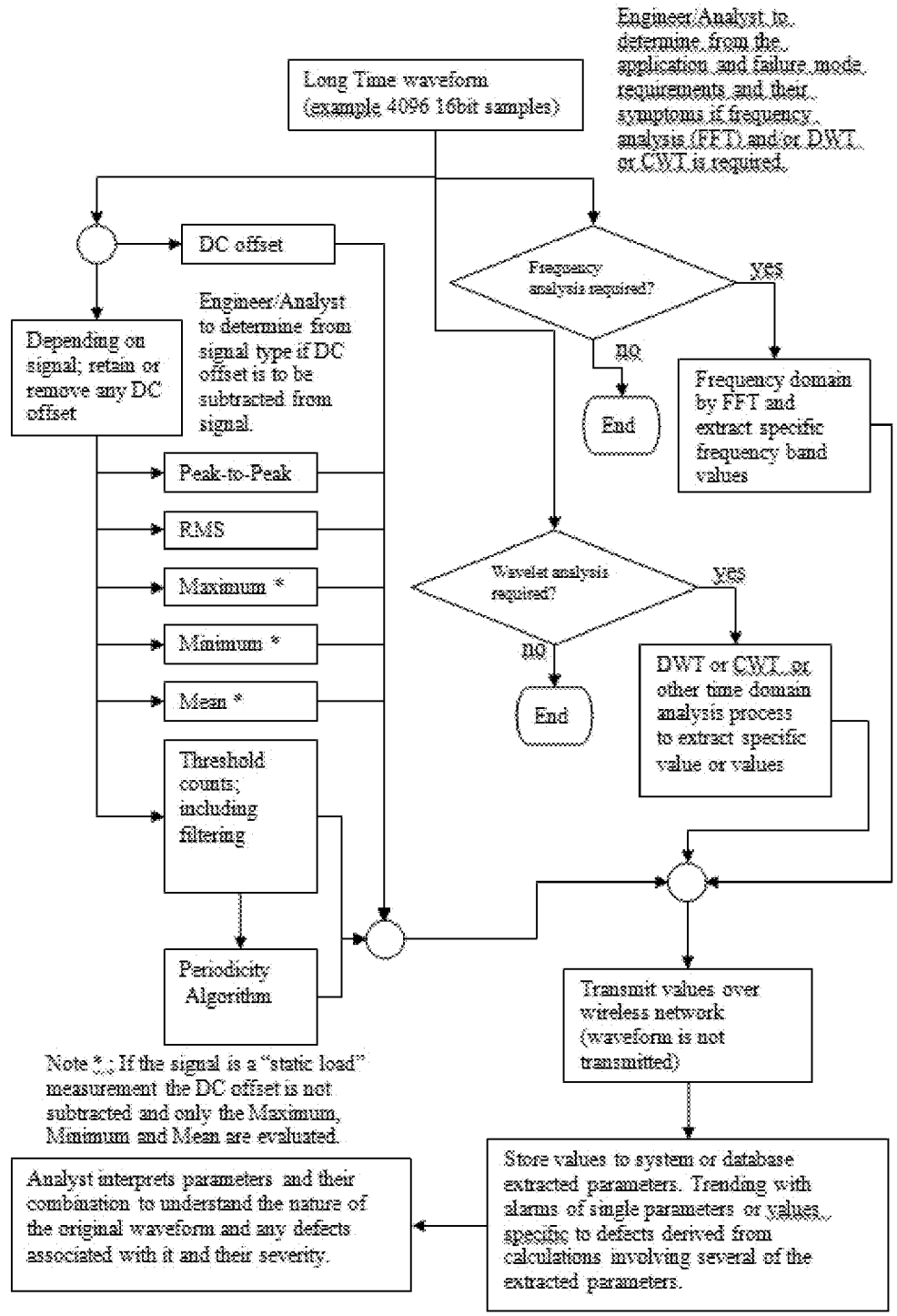
FIG. 2 is a flow chart showing the steps of a method according to an embodiment of the invention.

FIG. 2 is a flow chart showing the steps of a method according to an embodiment of the invention. In the method a time waveform is obtained from a sensor 14 of a condition monitoring system 10 for monitoring at least one component 12. An analyst can decide whether it is necessary to retain or remove any DC offset from the time waveform. If necessary, a Fast Fourier Transform (FFT) is performed by the sensor 14 or by a processing unit 16.

At least two parameters are extracted from the time waveform and/or FFT using Discrete Wavelet Transform (DWT), Continuous Wavelet Transform (CWT) or another time domain analysis. The at least two parameters are at least two of the following: quantitative or statistical parameters, a peak-to-peak amplitude, a Root Mean Squared (RMS) amplitude, a statistical value such as a maximum, minimum, mean or median value, Crestfactor, Kurtosis, threshold crossing event counts, periodicity of events values, wavelet- or FFT-derived amplitudes or parameters, such as harmonic activity or sideband activity.

The at least two parameters extracted from the time waveform and/or FFT are transmitting and/or displayed instead of the dynamic signal time waveform data and/or a Fast Fourier Transform (FFT). The at least two parameters may be transmitted wirelessly over a wireless network, in a wired manner, or in a combination of wired and wireless manners.

The at least two parameters may then be analyzed or processed further to obtain condition status information concerning the at least one component being monitored and/or to understand the nature of the original time waveform and any defect(s) associated with it and the severity thereof. The at least two parameters and/or the results of the analyses may be recorded in a database 24.

The at least two parameters may be used to make a prediction of the residual life of a bearing 12. Once such a prediction has been made, it may be displayed on display means 20, and/or sent to a user device 22, bearing manufacturer, database 24 and/or another prediction unit. Notification of when it is advisable to service, replace or refurbish one or more bearings 12 being monitored by the system 10 may be made in any suitable manner, such as via a communication network, via an e-mail or telephone call, a letter, facsimile, alarm signal, or a visiting representative of the manufacturer.

The prediction of the residual life of a bearing 12 may be used to inform a user of when he/she should replace the bearing 12. Intervention to replace the bearing 12 is justified, when the cost of intervention (including labor, material and loss of, for example, plant output) is justified by the reduction in the risk cost implicit in continued operation. The risk cost may be calculated as the product of the probability of failure in service on the one hand, and the financial penalty arising from such failure in service, on the other hand.

Figures 3, 4:
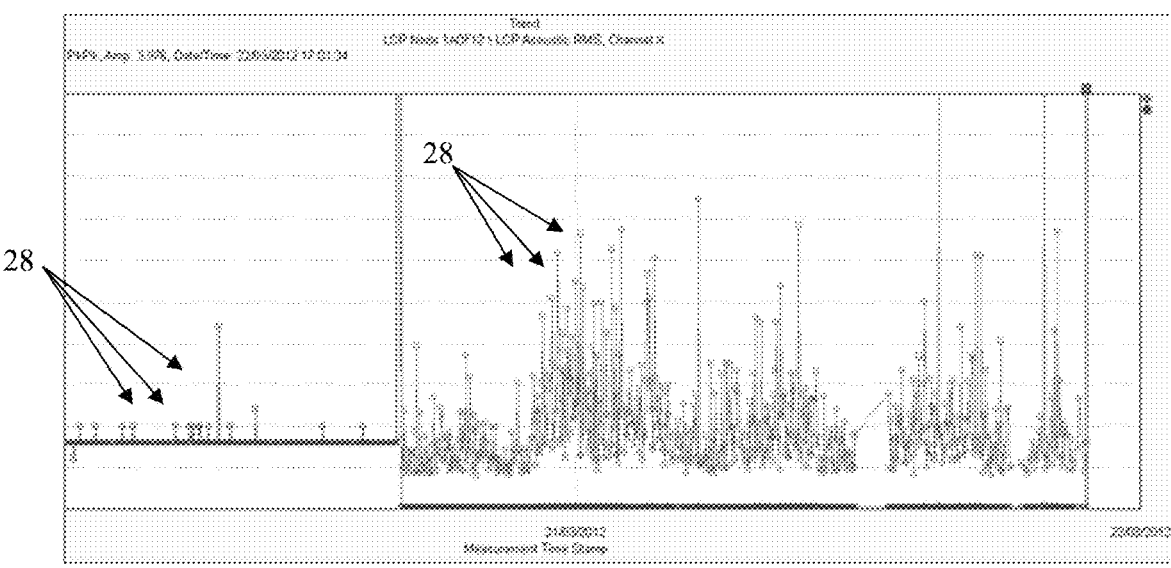
FIG. 3 shows an example of extracted parameters from an Acoustic Emission Enveloping (AEE) time waveforms.
FIG. 4 shows trends of Peak-to-peak and RMS parameters from the same AEE time waveforms.

FIG. 3 shows a table of data that may be obtained from an Acoustic Emission Enveloping (AEE) sensor 14 of a condition monitoring system according to the present invention. Parameters 28, namely peak-to-peak values, RMS values and Counts with low, medium and high thresholds have been extracted from the AEE time waveform data 30 for transmission and/or displaying As further examples, parameters 28 such as maximum, minimum, peak-to-peak, mean and medium values may be extracted from a load time waveform. Maximum, minimum and mean vales may be extracted from static housing loads. Peak-to-peak, RMS and at least three off threshold crossing counts and periodicity values may be extracted from AEE time waveforms (demodulated AE time waveforms). Peak-to-peak, RMS, FFT frequency bands corresponding to 1× and 1× defect frequencies may be extracted from Acceleration enveloping time waveforms. Peak-to-peak and RMS of filtered signal may be extracted from dynamic roller pass loads by DWT, CWT, FFT or using another filter with or without order tracking.

FIG. 4 shows trends of peak-to-peak and RMS parameters extracted from the same AEE time waveforms. Extracted parameters 28 may namely be processed further to reveal trends and thereby provide further condition status information concerning the at least one component being monitored and to understand the nature of the original time waveforms from which they were extracted and any defect(s) associated with them and the severity thereof.

As further examples, parameters 28 such as low, medium and high thresholds may be extracted from AEEE Event counts. Trends of low, medium and high counts may be extracted from AEE time waveforms. Trends of static (mean) load or trends of dynamic (peak-to-peak) load may be extracted from time waveforms.

Further modifications of the invention within the scope of the claims would be apparent to a skilled person. Even though the described embodiments are directed to a method, system and computer program product for monitoring at least one component such as a bearing, such a method, system and computer program product may be used for monitoring and optionally predicting the residual life of another component of rotating machinery, such as a gear wheel.

The invention claimed is:

1. A method for processing dynamic signal data obtained from a condition monitoring system, the method comprising:
   obtaining the dynamic signal data in a form of at least one of an acoustic emission enveloping time waveform and a Fast Fourier Transform (FFT) from an acoustic emission enveloping sensor of the condition monitoring system, the acoustic emission enveloping sensor coupled to a component;
   extracting at least two parameters from the at least one of the acoustic emission enveloping time waveform and the Fast Fourier Transform FFT, the at least two parameters comprising peak-to-peak values and root means squared values and counts with low, medium, and high thresholds;
   transmitting and displaying the at least two parameters instead of at least one of the acoustic emission enveloping time waveform data and the Fast Fourier Transform (FFT); and
   electronically recording the at least two parameters in a database with respect to residual life data gathered in the database for the component, the residual life data comprising information about relationships between types or environments of usage versus rates of change of residual life for the component,
   wherein the at least two parameters are used to predict of the residual life of the component as a residual life prediction, the residual life prediction being provided to another database that provides notifications of when to service, replace, or refurbish the component, the residual life prediction is utilized to determine a cost of intervention by a reduction in a risk cost implicit in continued operation of the component,
   wherein the component is serviced, replaced, or refurbished in accordance with the notification and the cost of intervention.

2. The method according to claim 1, wherein the step of extracting at least two parameters is carried out using one of: Discrete Wavelet Transform (DWT), Continuous Wavelet Transform (CWT) or another time domain analysis.

3. The method according to claim 1, wherein the at least two parameters comprises: quantitative or statistical parameters, a peak-to-peak amplitude as one or the peak-to-peak values, a root mean squared amplitude as one or the root mean squared values, a statistical value, a maximum statistical value, a minimum statistical value, a mean statistical value, a median statistical value, a Crestfactor, a Kurtosis, threshold crossing event counts as one or the root mean squared counts, periodicity of events values, wavelet-derived amplitudes, wavelet-derived parameters, FFT-derived amplitudes, FFT-derived parameters, harmonic activity, and sideband activity.

4. The method according to claim 1, wherein the an acoustic emission enveloping sensor obtains data comprising: vibration, vibration enveloping, acoustic emission, acoustic emission enveloping, temperature, a rolling contact force, a rolling contact stress, high frequency stress waves, a lubricant condition, rolling surface damage, an operating speed, a load carried, lubrication conditions, humidity, exposure to moisture, exposure to ionic fluids, exposure to mechanical shocks, corrosion, fatigue damage, and wear.

5. The method according to claim 1, wherein the at least two parameters are transmitted wirelessly over a wireless communication network.

6. The method according to claim 1, wherein the condition monitoring system is arranged to monitor at least one bearing.

7. The method according to claim 1, wherein the condition monitoring system is arranged to monitor at least rolling element bearing.

8. A computer program product comprising a non-transitory computer readable medium comprising computer program code for possessing dynamic signal data obtained from a condition monitoring system, the computer program code causing a processor to execute:
   obtaining the dynamic signal data in the form of at least one of an acoustic emission enveloping time waveform and a Fast Fourier Transform (FFT) from an acoustic emission enveloping sensor of the condition monitoring system, the acoustic emission enveloping sensor coupled to a component;
   extracting at least two parameters from the at least one of the acoustic emission enveloping time waveform and the Fast Fourier Transform FFT, the at least two parameter comprising peak-to-peak values and root means squared values and counts with low, medium, and high thresholds;

transmitting and displaying the at least two parameters instead of at least one of the acoustic emission enveloping time waveform data and the Fast Fourier Transform (FFT); and electronically recording the at least two parameters in a database with respect to residual life data gathered in the database for the component, the residual life data comprising information about relationships between types or environments of usage versus rates of change of residual life for the component, wherein the at least two parameters are used to predict of the residual life of the component as a residual life prediction, the residual life prediction being provided to another database that provides notifications of when to service, replace, or refurbish the component, wherein the component is serviced, replaced, or refurbished in accordance with the notification.

9. A system for processing dynamic signal data obtained from a condition monitoring system, the system comprising:
a database;
an acoustic emission enveloping sensor coupled to a component and providing the dynamic signal data in the form of one of: a time waveform or a Fast Fourier Transform (FFT);
a processing unit arranged to extract at least two parameters from at least one of: the acoustic emission enveloping time waveform and Fast Fourier Transform (FFT), the at least two parameter comprising peak-to-peak values and root means squared values and counts with low, medium, and high thresholds; and
a transmission system arranged to transmit and a display system arranged to display the at least two parameters instead of at least one of the acoustic emission enveloping time waveform data and the Fast Fourier Transform (FFT); and
electronically recording the at least two parameters in the database with respect to residual life data gathered in the database for the component, the residual life data comprising information about relationships between types or environments of usage versus rates of change of residual life for the component,
wherein the at least two parameters are used to predict of the residual life of the component as a residual life prediction, the residual life prediction being provided to another database that provides notifications of when to service, replace, or refurbish the component, the residual life prediction is utilized to determine a cost of intervention by a reduction in a risk cost implicit in continued operation of the component,
wherein the component is serviced, replaced, or refurbished in accordance with the notification and the cost of intervention.

10. The system according to claim 9, wherein the processing unit is arranged to extract the at least two parameters using one of: a Discrete Wavelet Transform (DWT), a Continuous Wavelet Transform (CWT) or another time domain analysis.

11. The system according to claim 9, wherein the at least two parameters comprises: quantitative or statistical parameters, a peak-to-peak amplitude as one or the peak-to-peak values, a root mean squared amplitude as one or the root mean squared values, a statistical value, a maximum statistical value, a minimum statistical value, a mean statistical value, a median statistical value, a Crestfactor, a Kurtosis, threshold crossing event counts as one or the root mean squared counts, periodicity of events values, wavelet-derived amplitudes, wavelet-derived parameters, FFT-derived amplitudes, FFT-derived parameters, harmonic activity, and sideband activity.

12. The system according to claim 9 wherein the an acoustic emission enveloping sensor obtains data comprising: vibration, vibration enveloping, acoustic emission, acoustic emission enveloping, temperature, rolling contact force, rolling contact stress, high frequency stress waves, a lubricant condition, rolling surface damage, an operating speed, a load carried, lubrication conditions, humidity, exposure to moisture, exposure to ionic fluids, exposure to mechanical shocks, corrosion, fatigue damage, and wear.

13. The system according to claim 9 wherein the transmitting system is arranged to transmit the at least two parameters wirelessly over a wireless communication network.

14. The system according to claim 9 wherein the condition monitoring system is arranged to monitor at least one bearing.

15. The system according to claim 9, wherein the condition monitoring system is arranged to monitor at least rolling element bearing.

* * * * *